United States Patent
Lakshmikumaran et al.

(10) Patent No.: US 6,433,959 B1
(45) Date of Patent: Aug. 13, 2002

(54) TAPE HEAD CONTOUR UTILIZING ENCLOSED THROUGH SLOTS

(75) Inventors: Anand V. Lakshmikumaran, Denver; Joseph E. Torline, Arvada, both of CO (US); Ramesh Sundaram, Fremont, CA (US); Terry Barber, Louisville; Ken Nosek, Arvada, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/699,868

(22) Filed: Oct. 30, 2000

(51) Int. Cl.[7] .............................................. G11B 5/187
(52) U.S. Cl. ...................................... 360/122; 360/129
(58) Field of Search ................................ 360/122, 221, 360/129

(56) References Cited

U.S. PATENT DOCUMENTS

| | | | |
|---|---|---|---|
| 3,327,916 A | * 6/1967 | Weidenhammer et al. | 360/221 |
| 4,130,847 A | 12/1978 | Head et al. | 360/122 |
| 4,325,093 A | 4/1982 | Ishii | 360/120 |
| 4,413,469 A | 11/1983 | Paquin | 57/293 |
| 4,809,104 A | 2/1989 | Knudsen et al. | 360/104 |
| 5,166,845 A | 11/1992 | Thompson et al. | 360/103 |
| 5,220,473 A | 6/1993 | Brock et al. | 360/21 |
| 5,237,476 A | 8/1993 | Bischoff et al. | 360/126 |
| 5,321,566 A | 6/1994 | Grant et al. | 360/85 |
| 5,602,703 A | 2/1997 | Moore et al. | 360/121 |
| 5,617,269 A | 4/1997 | Gordenker et al. | 360/77.12 |
| 5,774,306 A | 6/1998 | Wang et al. | 360/104 |
| 5,995,337 A | 11/1999 | Kira | 360/113 |
| 6,005,751 A | 12/1999 | Kazmierczak et al. | 360/106 |
| 6,014,291 A | 1/2000 | Watanabe et al. | 360/121 |
| 6,018,444 A | 1/2000 | Beck et al. | 360/121 |
| 6,038,108 A | 3/2000 | Dee et al. | 360/121 |
| 6,040,964 A | 3/2000 | Saliba | 360/121 |

* cited by examiner

Primary Examiner—Robert S. Tupper
(74) Attorney, Agent, or Firm—Carstens, Yee & Cahoon, L.L.P.

(57) ABSTRACT

A magnetic tape head assembly with enclosed through slots to eliminate an air bearing at high tape speeds and lower operating tape tensions is provided. In one embodiment of the present invention, the magnetic tape head comprises a recording gap, containing read/write elements, across the width of the head and slots exposed to the tape head surface that faces the plane of the tape. These slots run through the head approximately perpendicular to the plane of the tape and are open to ambient pressure at a tape head surface other than the surface facing the plane of the tape. These slots are aligned with the read/write elements along the recording gap.

18 Claims, 7 Drawing Sheets

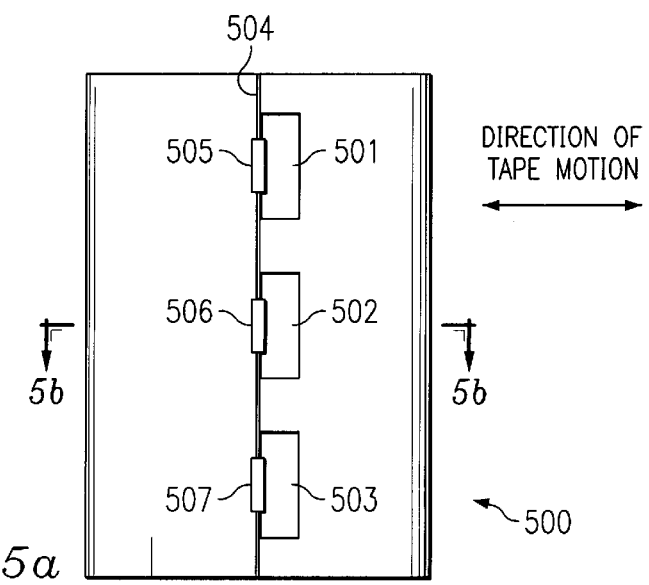
FIG. 5a
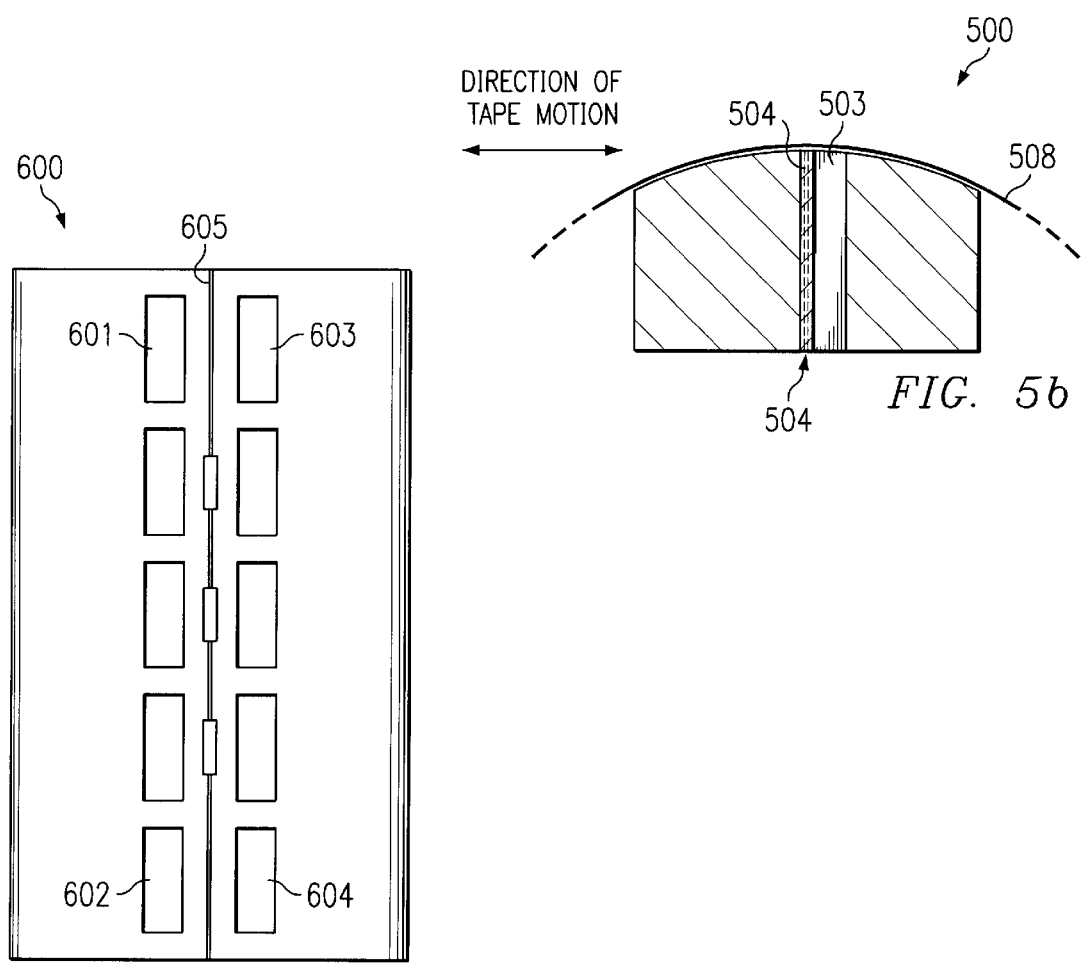
FIG. 5b
FIG. 6

TAPE HEAD CONTOUR UTILIZING ENCLOSED THROUGH SLOTS

BACKGROUND OF THE INVENTION

1. Technical Field

The present invention relates to magnetic tape read/write heads, and more specifically, to maintaining contact between a magnetic tape and tape head at high tape speeds and lower operating tape tensions.

2. Description of Related Art

As a tape moves over a tape head, an air bearing tends to form under the tape. This air bearing lifts the tape off the head, interfering with the read and write functions of the tape head. The air bearing increases as the speed of tape motion increases and as the tension of the tape decreases. In order to deal with the air bearing, tape heads are designed with slots open to ambient pressure. These slots remove the trapped air just before the tape passes over the recording gap, where the read/write elements are located, thus maintaining proper head/tape contact.

The two most common methods for eliminating an air bearing in tape drives are transverse slots and bleed slots. Bleed slots run parallel to the direction of tape motion in a downward slope. However, bleed slots require a minimum length to eliminate the air bearing, and this minimum length becomes a constraint on present tape head designs. For modern tape heads containing multiple recording gaps, small distances between the recording gaps are necessary in order to accommodate high-density data storage. The reduction of this gap-to-gap spacing is impaired by the minimum length requirements of the bleed slots.

The transverse slots run perpendicular to the direction of tape motion. One advantage of transverse slots is that they have very small width requirements, thus facilitating smaller spaces between recording gaps. Unfortunately, as the flexible tape passes over a transverse slot, the tape conforms to the slot, which results in "tenting" of the tape beyond the trailing edge of the slot, possibly interfering with proper head/tape contact over the recording gap. To overcome this tenting effect, the transverse slots must be placed a minimum distance from the recording gap, depending on slot width, radius, tape thickness, tape tension, etc. This minimum distance places constraints on reducing gap-to-gap spacing in head designs, resulting in problems similar to bleed slots. In addition, when the tape conforms to the transverse slots it tends to scrape against the edge of the slot, resulting in wear and debris accumulation.

Therefore, a slot design that requires a small enough area on the surface of the tape head to accommodate close gap-to-gap spacing, but does not cause tape tenting, would be desirable.

SUMMARY OF THE INVENTION

The present invention provides a magnetic tape head assembly with enclosed through slots to eliminate an air bearing at high tape speeds and lower operating tape tensions. In one embodiment of the present invention, the magnetic tape head comprises a recording gap, containing read/write elements, across the width of the head and slots exposed to the tape head surface that faces the plane of the tape. These slots run through the head approximately perpendicular to the plane of the tape and are open to ambient pressure at a tape head surface other than the surface facing the plane of the tape. These slots are aligned with the read/write elements along the recording gap.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5a and 5b illustrate the top and cross-sectional views, respectively, of a single module of a cylindrical head with a single row of through slots;

FIG. 6 illustrates the top view of a single module of a cylindrical head with additional through slots not aligned with read/write elements;

DETAILED DESCRIPTION OF THE PREFERRED EMBODIMENT

Track density on tape refers to the number of tracks per unit width (direction perpendicular to tape motion) of the tape, and linear recording density describes the number of bits (0s and 1s) that can be recorded per unit length (direction parallel to tape motion). These two densities together define the total recording density and hence, tape cartridge capacity. As track densities increase, the space between recording gaps (known as gap-to-gap spacing) becomes smaller in order to reduce error due to azimuth (the angle of rotation that is about the axis perpendicular to the plane of the tape). Higher linear recording density requires smaller head-to-tape spacing, eliminating more of the air bearing (trapped air) that is formed between the moving tape and the tape head. This becomes more important as thinner tapes (to increase cartridge capacity) are transported at higher speeds (to increase data rate).

Figure 1A:
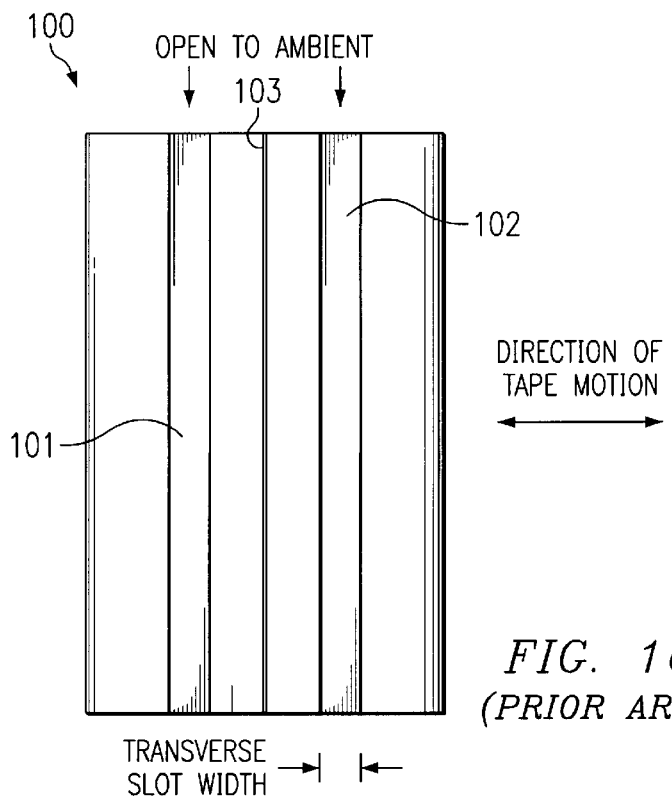
FIGS. 1a and 1b illustrate the top and side views, respectively, of a single module of a cylindrical head with transverse slots.
Figure 1B:
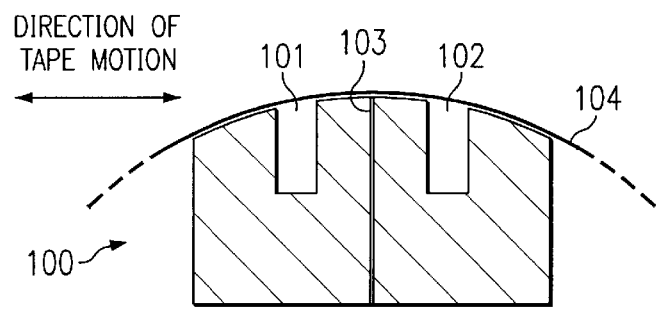

With reference now to FIGS. 1a and 1b, schematic diagrams illustrating the top and side views, respectively, of a single module of a cylindrical tape head with transverse slots are depicted in accordance with the prior art. Transverse slots 101 and 102 run across the width of the head 100, perpendicular to tape motion, and are open to ambient pressure at both ends, which allows any air pushed through the slots to pass out of the head 100. Between the transverse slots 101 and 102 is the recording gap 103, where the read/write elements are located.

As the tape 104 passes over the head 100, air may become trapped under the tape 104 and lift it off the head 100. This trapped air, known as an air bearing, prevents proper contact between the tape 104 and the read/write elements in the recording gap 103. Depending on the direction of motion, the tape 104 must pass over either slot 101 or 102 before passing over the recording gap 103. As the tape 104 crosses the transverse slots 101 and 102, any air bearing under the tape 104 is scraped out from underneath and pushed out of the head 100 through the transverse slots 101 and 102. With the air bearing removed, the tape 104 maintains close contact with the head 100 as it passes over the recording gap 103, thus ensuring proper read/write functions.

Unfortunately, there are problems associated with the transverse slot design. Because the transverse slots 101 and 102 run continuously across the entire width of the head 100, the flexible tape 104 can conform to the indentation of the transverse slots 101 and 102.

Figure 1C:
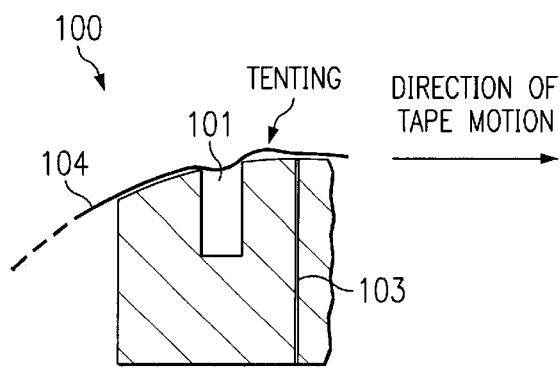
FIG. 1c illustrates tape tenting in a single module of a cylindrical head with transverse slots.

With reference to FIG. 1c, a schematic diagram illustrating tape-conformance to transverse slots is depicted in accordance with prior art. In this example, the tape 104 passes over transverse slot 101 before passing over the recording gap 103. The tape 104 conforms to transverse slot 101, which causes the tape 104 to "tent", in which the tape 104 buckles and rises off the head 100 just past the edge of transverse slot 101. If this tenting occurs too close to the recording gap 103, the tape 104 will not maintain proper contact with the tape head 100, which interferes with the read/write functions. In order to overcome this tenting effect, the transverse slots 101 and 102 must be moved a minimum distance away from the recording gap 103. This minimum distance requirement is dependent on factors such as, for example, slot width, radius, tape tension, and tape thickness. Even though transverse slots themselves may be narrow, the minimum distance needed to overcome tenting places constraints on reducing the space between recording gaps, which is necessary for handling an increased density of data storage.

Conformance of the tape 104 to the transverse slots 101 and 102 also increases contact pressure with the edges of the transverse slots 101 and 102. This increased contact pressure can result in wear of the slot edges and accumulation of debris within the transverse slots 101 and 102, which will reduce the head contour's effectiveness at maintaining proper head/tape contact.

Figure 2:
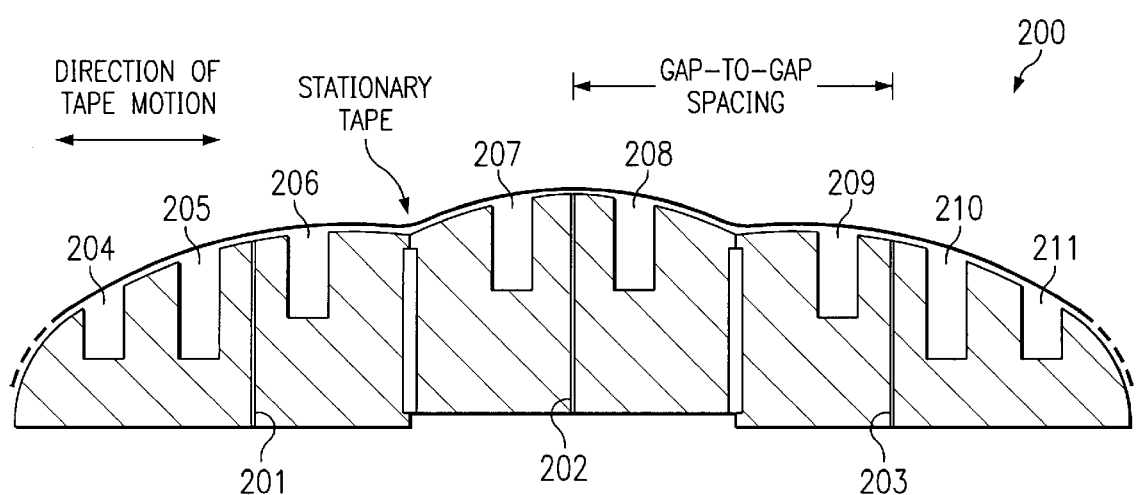
FIG. 2 illustrates the side view of a three-module tape head contour with transverse slots.

With reference to FIG. 2, a schematic diagram illustrating the side view of a three-module tape head contour with transverse slots is depicted in accordance with the prior art. As explained above, in order to accommodate increased track densities on tape, the spacing between the recording gaps 201, 202, and 203 must be reduced. However, if the transverse slots 204–211 require a minimum distance from gaps 201–203 to overcome tenting, then reducing the gap-to-gap spacing becomes exceedingly difficult.

Figure 3A:
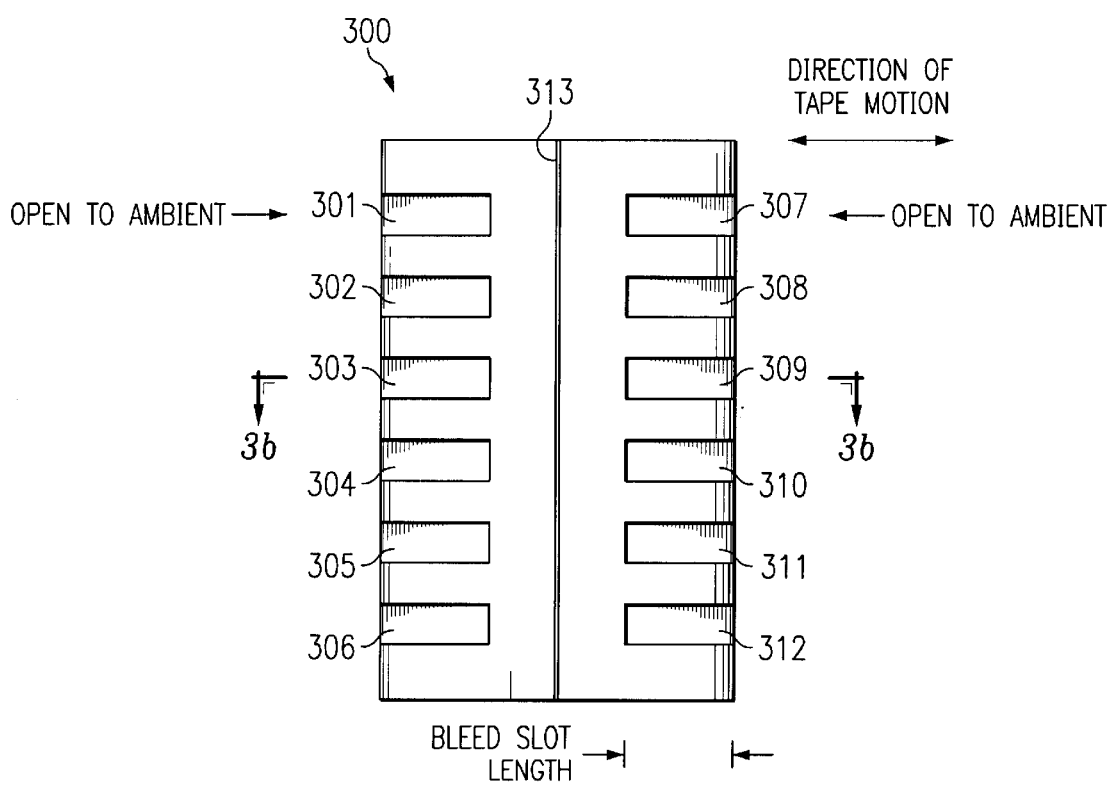
FIGS. 3a and 3b illustrate the top and side views, respectively, of a single module of a cylindrical head with bleed slots.
Figure 3B:
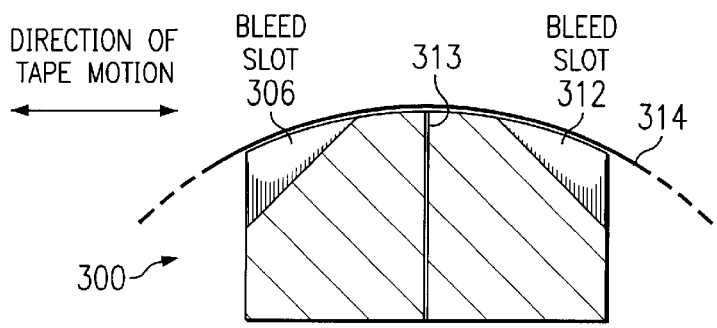

With reference to FIGS. 3a and 3b, schematic diagrams showing the top and side views, respectively, of a single module of a cylindrical head with bleed slots are depicted in accordance with prior art. The bleed slots 301–312 run parallel to tape motion, in a downward slope, and are open to ambient pressure on the sides of the head 300 as indicated. As the tape 314 passes over the bleed slots 301–312, any air bearing underneath is forced downward along the slope of the slots.

Because the bleed slots 301–312 are not continuous across the width of the head 300, there is far less potential for tape conformance and tenting than there is with the transverse slot design. However, the bleed slots 301–312 must be a minimum length in order to effectively remove any air bearing under the tape 314. This minimum length requirement exceeds the gap-to-gap spacing requirements for high-density data storage. Thus, the bleed slot design runs into constraints similar to the transverse slot design.

Figure 4A:
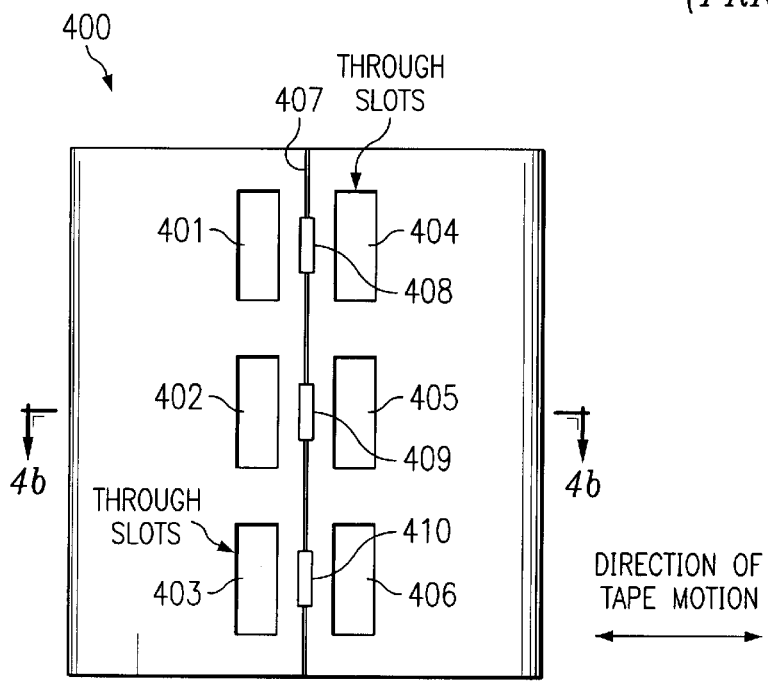
FIGS. 4a and 4b illustrate the top and cross-sectional views, respectively, of a single module of a cylindrical head with a double row of through slots.
Figure 4B:
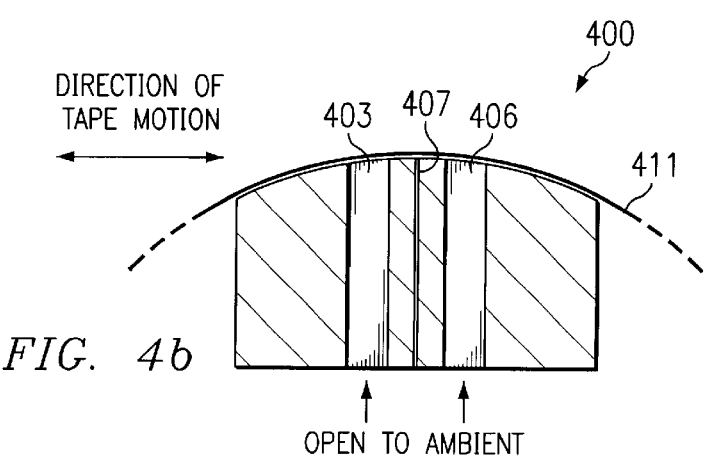

With reference now to FIGS. 4a and 4b, schematic diagrams illustrating the top and cross-sectional views, respectively, of a single module of a cylindrical head utilizing the enclosed through slot design are depicted in accordance with the present invention. The head 400 comprises two rows of enclosed through slots 401–406 on either side of the recording gap 407, which contains read/write elements 408–410.

Like the transverse slot design, the openings of the through slots 401–406 run perpendicular to the direction of tape motion and require very small widths. Unlike transverse slots, the through slots 401–406 go down through the tape head and are open to ambient pressure from the bottom of the head. The through slots 401–406 do not run continuously across the entire width of the head but instead are arranged in series and placed in line with the recording elements 408–410 on the head 400.

The through slots 401–406 eliminate the air bearing when the tape 411 is in motion, thus maintaining head/tape contact over the recording gap 407. In the recording gap 407, the recording elements 408–410 are located only for a fraction of the width of the tape 411 (usually one half to one fourth of the width) and hence, at any given time, only a fraction of the tape width is being recorded on or read from. Hence, it is only over that fraction of the tape 411 that head/tape contact must be maintained. This not only reduces wear on the head 400, but also reduces damage to the tape 411 as it moves in contact across the head 400.

Because the through slots 401–406 do not run continuously across the entire width of the head, the tape 411 conforms less to them and tents less than with transverse slots. This reduction in tenting allows the through slots 401–406 to be placed close to the recording gap 407, thus allowing substantial reductions in gap-to-gap spacing. Additionally, because the tape 411 conforms to the through slots 401–406 much less than the way the tape 104 does with transverse slots 101 and 102, there is far less contact pressure, and hence less wear and debris accumulation within the through slots 401–406.

With reference to FIGS. 5a and 5b, schematic diagrams illustrating the top and cross-sectional views, respectively, of another embodiment of a tape head with the through slot design are depicted in accordance with the present invention. In this embodiment, there is only one row of through slots 501–503, which are placed adjacent to the recording gap 504 and in line with the recording elements 505–507. This arrangement allows a single row of slots 501–503 to maintain proper head/tape contact in both directions of tape motion. In addition, the single-row configuration provides tremendous potential for reducing gap-to-gap spacing by dramatically reducing the minimum distance requirements between the recording gap 504 and through slots 501–503.

In reference to FIG. 6, a schematic diagram illustrating the top view of an additional embodiment of the present invention in depicted. In this embodiment, additional through slots 601–604 have been added at the ends of recording gap 605 to increase performance. These additional slots 601–604 are not aligned with any read/write elements. It must be pointed out that the embodiment depicted in FIG. 6 applies equally to tape heads with a single row of through slots.

Figure 7A:
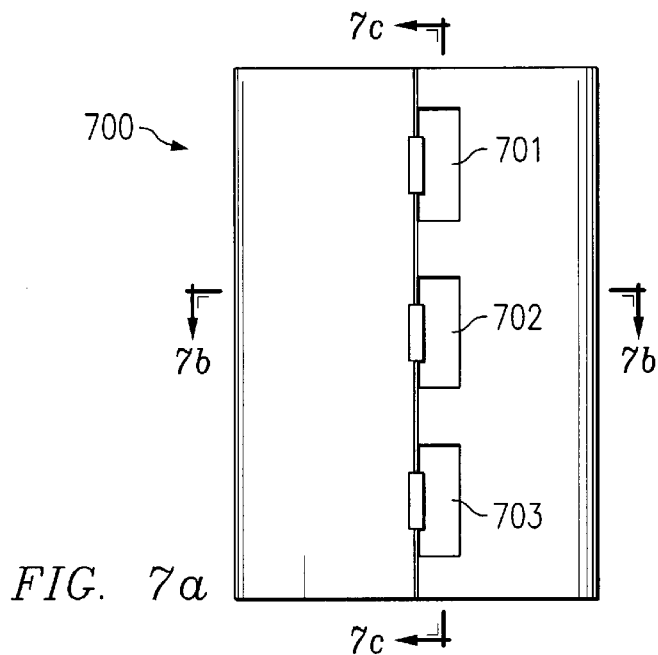
FIGS. 7a, 7b, and 7c illustrate the top and two cross sectional views, respectively, of a single module of a cylindrical head with a single row of through slots, in which the slots open into a common channel.
Figure 7B:
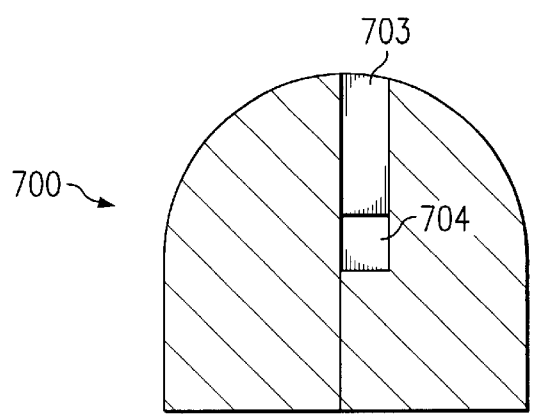
Figure 7C:
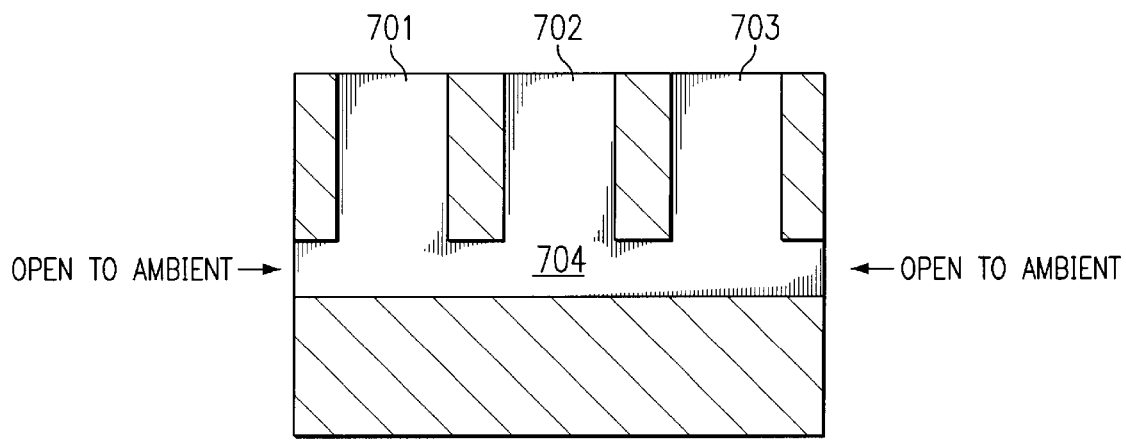

Referring now to FIGS. 7a, 7b, and 7c, schematic diagrams illustrating the top and two cross-sectional views of a tape head are depicted in accordance with another embodiment of the present invention. In this embodiment, through slots 701–703 open into a common channel 704, which is open to ambient pressure as indicated in FIG. 7c. This approach can be changed so that the common channel is open to ambient pressure from any surface of the tape head, except the surface facing the plane of the tape.

Figure 8:
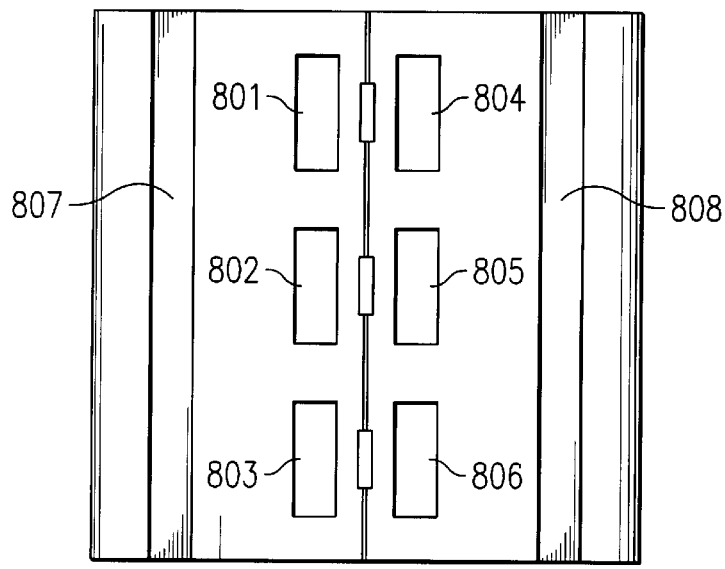
FIG. 8 illustrates the top view of a single module of a cylindrical head with a double row of through slots in combination with transverse slots.
Figure 9:
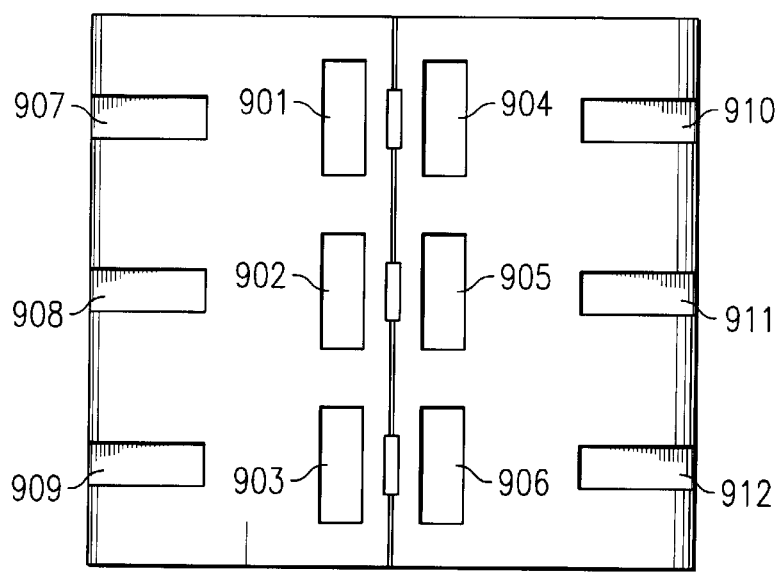
FIG. 9 illustrates the top view of a single module of a cylindrical head with a double row of through slots in combination with bleed slots.
Figure 10:
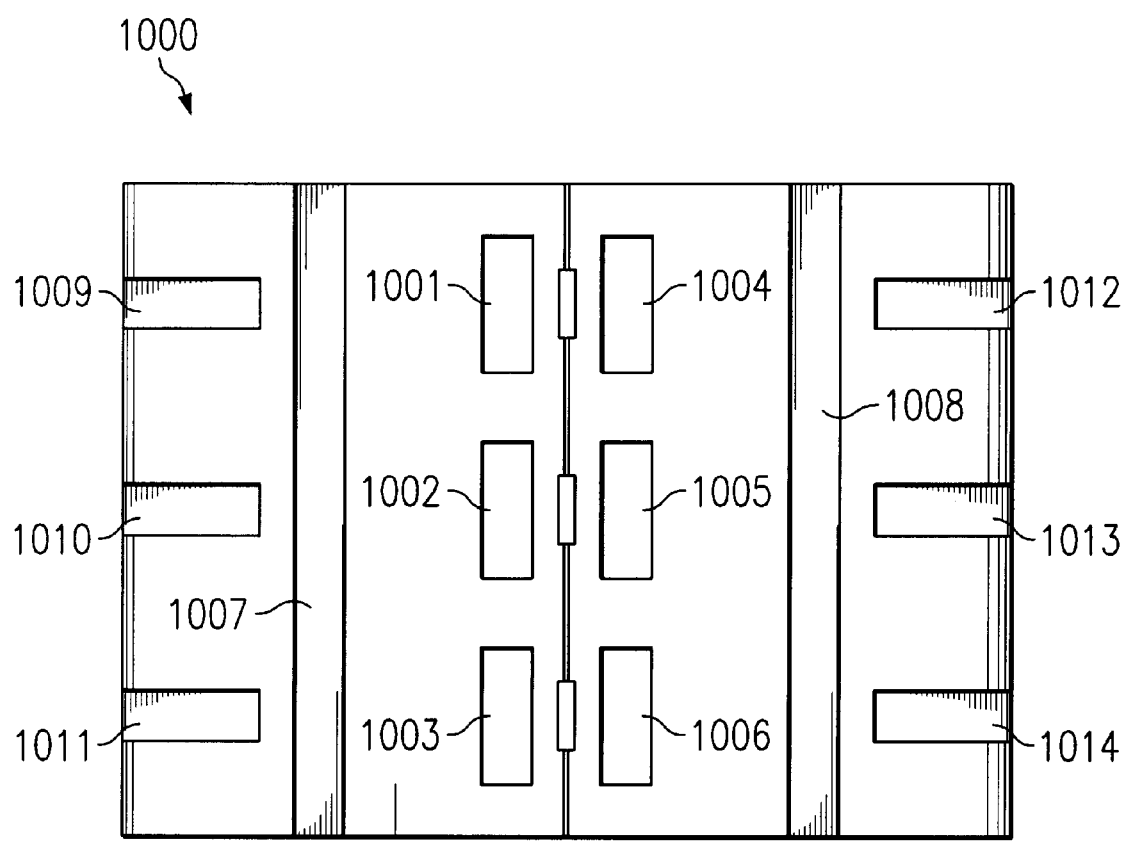
FIG. 10 illustrates the top view of a single module of a cylindrical head with a double row of through slots in combination with transverse slots and bleed slots.

It must also be pointed out that the through slot design of the present invention could also be used in combination with bleed slots and transverse slots when gap-to-gap spacing is not an issue but running thinner tapes at higher speeds is. These variations are illustrated in FIGS. 8, 9, and 10.

The through slot design of the present invention meets the requirements of future generation tape drives. Proper head/tape contact is maintained at high tape speeds and with thinner tapes and lower tape tensions. In addition, the ability to place the slots close to the recording gaps facilitates the reduction in gap-to-gap spacing required by high-density data storage on magnetic tape.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A magnetic tape head assembly, comprising:
   a recording gap, containing read/write elements, extending across a width of the tape head; and
   slots exposed through a top of the tape head to the tape head surface that faces the plane of a tape;
   wherein the slots run through the tape head approximately perpendicular to the plane of the tape from the top of the tape head to a bottom of the tape head, said slots being open to ambient pressure through the top and bottom of the tape head.

2. The magnetic tape head in claim 1, wherein the slots are open to ambient pressure at a tape head surface other than the tape head surface facing the plane of the tape.

3. The magnetic tape head in claim 1, wherein the slots are arranged in line with the read/write elements along the recording gap.

4. The magnetic tape head in claim 1, further comprising an additional slot at an end of the recording gap wherein the additional slot is not aligned with a corresponding read/write element.

5. The magnetic tape head in claim 1, wherein the slots are placed in rows on both sides of the recording gap.

6. The magnetic tape head in claim 1, wherein the slots are placed in a single row adjacent to the recording gap.

7. The magnetic tape head in claim 1, wherein the slots open into a common channel which runs below the tape head surface that faces the plane of the tape.

8. The magnetic tape head in claim 1, further comprising transverse slots.

9. The magnetic tape head in claim 1, further comprising bleed slots.

10. The magnetic tape head in claim 1, further comprising transverse slots and bleed slots.

11. The magnetic tape head according to claim 1, further comprising:
    a row of said slots, said row being located across the tape head surface that faces the plane of the tape transverse to a direction of the tape.

12. The magnetic tape head according to claim 11, further comprising:
    said slots being located in said row in series transversely across the tape head surface.

13. The magnetic tape head according to claim 12, further comprising:
    a second row of generally rectangular slots, each one of said slots in said second row being located in series transversely across the tape head surface, each one of said slots in said second row having a length and a width, said length being longer than said width, each one of said slots in said second row being positioned such that said width is transverse to a direction of movement of said tape; and
    each one of said slots in said row having a length and a width, said length being longer than said width, each one of said slots being positioned such that said length is transverse to a direction of movement of said tape.

14. The magnetic tape head according to claim 11, further comprising:
    a plurality of rows of said slots, each one of said plurality of rows being located across the tape head surface that faces the plane of the tape transverse to a direction of the tape.

15. The magnetic tape head according to claim 11, further comprising:
    said row of said slots being located adjacent to a recording gap.

16. The magnetic tape head according to claim 13, further comprising:
    said row of said slots being located adjacent to a row of a plurality of recording elements.

17. The magnetic tape head according to claim 1, further comprising:
    each one of said slots each being generally rectangular.

18. The magnetic tape head according to claim 17, further comprising:
    each one of said generally rectangular slots having a length and a width, said length being longer than said width, each one of said slots being positioned such that said length is transverse to a direction of movement of said tape.

* * * * *